US005601241A

United States Patent [19]
Brewster

[11] Patent Number: 5,601,241
[45] Date of Patent: Feb. 11, 1997

[54] MATERIAL DISINTEGRATING APPARATUS

[76] Inventor: Douglas K. Brewster, P.O. Box 339, Earl Grey, Saskatchewan, Canada, S0G 1J0

[21] Appl. No.: 491,296

[22] Filed: Jun. 12, 1995

[51] Int. Cl.⁶ .................................. B02C 13/04/21/02
[52] U.S. Cl. ........................ 241/101.76; 241/262; 241/605
[58] Field of Search .................. 241/101.76, 101.761, 241/262, 605

[56] References Cited

U.S. PATENT DOCUMENTS

| | | | |
|---|---|---|---|
| 4,524,916 | 6/1985 | Keyes et al. | 241/605 X |
| 4,621,776 | 11/1986 | Hostetler | 241/605 X |
| 4,773,600 | 9/1988 | Metski | 241/101.7 |
| 5,082,187 | 1/1992 | Kirchhoff et al. | 241/84 |
| 5,154,363 | 10/1992 | Eddy | 241/30 |
| 5,255,867 | 10/1993 | Whittleton et al. | 241/101.7 |

FOREIGN PATENT DOCUMENTS

| | | |
|---|---|---|
| 1186598 | 5/1985 | Canada . |
| 1297388 | 3/1992 | Canada . |
| 2086569 | 1/1995 | Canada . |

*Primary Examiner*—John M. Husar

[57] ABSTRACT

An apparatus for disintegrating baled crop material of various shapes and sizes includes a frame having a longitudinal axes and a material supporting floor with a centrally located first opening, mounted on the frame. Beneath the material supporting floor and in communication with the first opening is a rotary material disintegrating drum with pivoted material engaging sharp flails which while rotating pass through the first opening engaging and disintegrating the material placed on the material supporting floor. Slidably mounted on the material supporting floor is a material receiving chamber which is driven in a reciprocating manner back and forth across the material supporting floor substantially transverse to the longitudinal axis thereby positioning material placed therein over the first opening for flail engagement. Beneath and to one side of, and in communication with, the rotary drum with flails is a discharge exit with an adjustable deflector to control the ultimate location of the discharged material. The apparatus generally also includes transporting wheels rotatably mounted on the frame, a hydraulically powered loader pivotally mounted on the frame and a hydraulic power cylinder to pivot the material supporting floor relative to the frame which can vary the rate of disintegration by moving the material supporting floor away from the disintegrating flails mounted on the rotary drum.

23 Claims, 3 Drawing Sheets

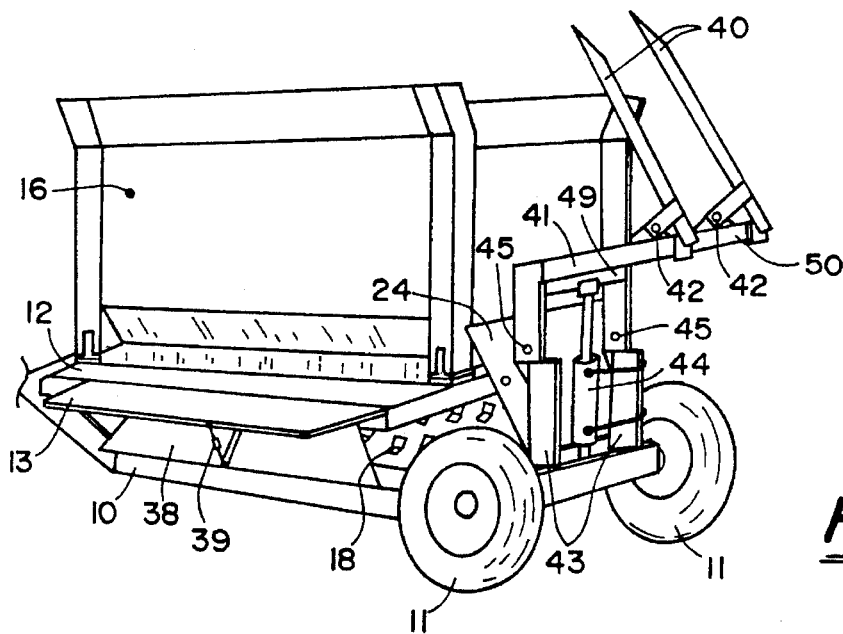
Fig. 5
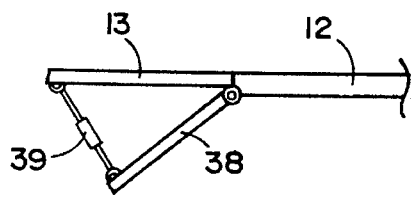
Fig. 8
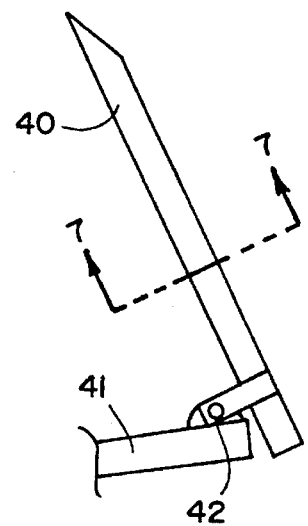
Fig. 6
Fig. 7
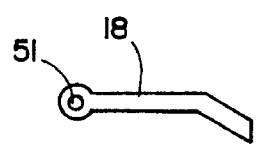
Fig. 9
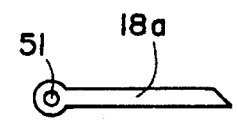

MATERIAL DISINTEGRATING APPARATUS

This application relates to material disintegrating apparatus and more particularly to the disintegrating of baled crop material of all shapes and sizes.

BACKGROUND OF INVENTION

Over the last 20 years there have been numerous attempts to provide for the disintegration or shredding of crop material such as straw, hay, or the like. There has been a need to process this crop material for feed wagons on large farms and feed lots and for better utilization of bedding and making feed more palatable for middle and small farm operations.

The present technology, although providing for the shredding of large well-made round bales does not adequately address the processing of poorly made round bales, soft core round bales, high moisture content bales, frozen and flattened bales or bales of various shapes and sizes.

Some examples of the present known technology are High-Line Canadian patent #2086569, Haybuster Canadian patent #1186598 and Herron et al Canadian patent #1297388.

The Canadian patent "569" to High-Line teaches a semi-circular bale receiving chamber fixed to a frame. The bale is supported and rotated by two support rollers which can be driven in two directions. A rotating drum with disintegrating flails engages the bale and ejects the disintegrated material out of a side exit. It is abundantly clear that this device can only properly handle large well-made round bales. This device is totally different from applicants device in that applicants device has a reciprocating bale receiving chamber mounted on a flat material supporting means for complete acceptance and clearance of all types of bales.

Canadian patent "598" to Haybuster teaches a machine for grinding large bales having a pivoting cradle which can engage a bale and pivot it to a position in contact with flail knives for grinding. A conveyor is provided to urge the bale toward the grinding rotor at the same time rotating the bale. This device is clearly different from applicants device which has a flat bale supporting means and a bale receiving chamber that reciprocates transverse to the longitudinal axis of the machine.

Canadian patent "388" to Herron et al teaches a tiltable bale receiving chamber which has a floor rotatable relative to the walls and whose floor is mounted for pivotal longitudinal simultaneous movement with the bale chamber. Applicants device has a floor which is transversely pivotal relative to the frame and a bale chamber that moves across the floor in a back and forth motion transverse to the longitudinal axis of the frame.

SUMMARY OF THE INVENTION

There has been some difficulty in handling all types of bales or crop material under all conditions. The large round bales which are most commonly used today are of the hard core type and the soft core type. These bales are often found to be flat on one side, frozen etc., and are difficult to be processed in some machines. To obviate any of the above problems applicant has provided a device or machine that can handle all types of bales under all conditions. Applicants machine provides a frame having a longitudinal axis, a crop material support in the form of a flat floor which can be pivotally mounted relative to the frame and which includes a first opening with grid control members, a material receiving chamber moveably mounted on the material supporting means, a first drive that moves the receiving chamber in a reciprocating back and forth motion substantially transverse to the longitudinal axis thereby moving the material in the receiving chamber over the first opening, a material disintegrator rotatably mounted on the frame and including cutting flails which during operation protrude above the material support through the first opening thereby engaging and disintegrating the material positioned over the first opening, a loading means mounted on the frame to place the crop material in the material receiving chamber and a discharge means mounted on the frame in communication with the material disintegrator and including a second opening through which the disintegrated material is ejected.

From the above summary it is readily discernible that the principal object of the present invention is to provide a crop material disintegrator that will process all sizes and shapes of baled material under a variety of conditions in a complete and expiditious manner.

It is a further object of the present invention to provide a baled material disintegrator that completely removes all material from the material receiving chamber.

It is yet another object of the present invention to provide a transversely tiltable load supporting means to vary the rate of feeding of the material to the disintegrator.

It is still a further object of the present invention to provide a material receiving chamber that reciprocates the material across an opening occupied by rotating cutting flails during operation.

These and other objects of the present invention will become readily apparent as the following description is read in conjunction with the accompanying drawings wherein like reference numerals indicate like elements throughout the several views.

DESCRIPTION OF THE DRAWINGS

FIG. 5 is a left rear perspective view of the material disintegrating apparatus including the loading mechanism and material outlet deflector.

FIG. 6 is a side elevation of the pivotal tine mounting.

FIG. 7 is a cross section of the pivotal tine taken at the cutting plane 7—7 in FIG. 6.

FIG. 8 is an end elevation of the adjustable material deflector.

FIG. 9 shows two embodiments of the cutting flails.

DETAILED DESCRIPTION OF INVENTION

Figure 1:
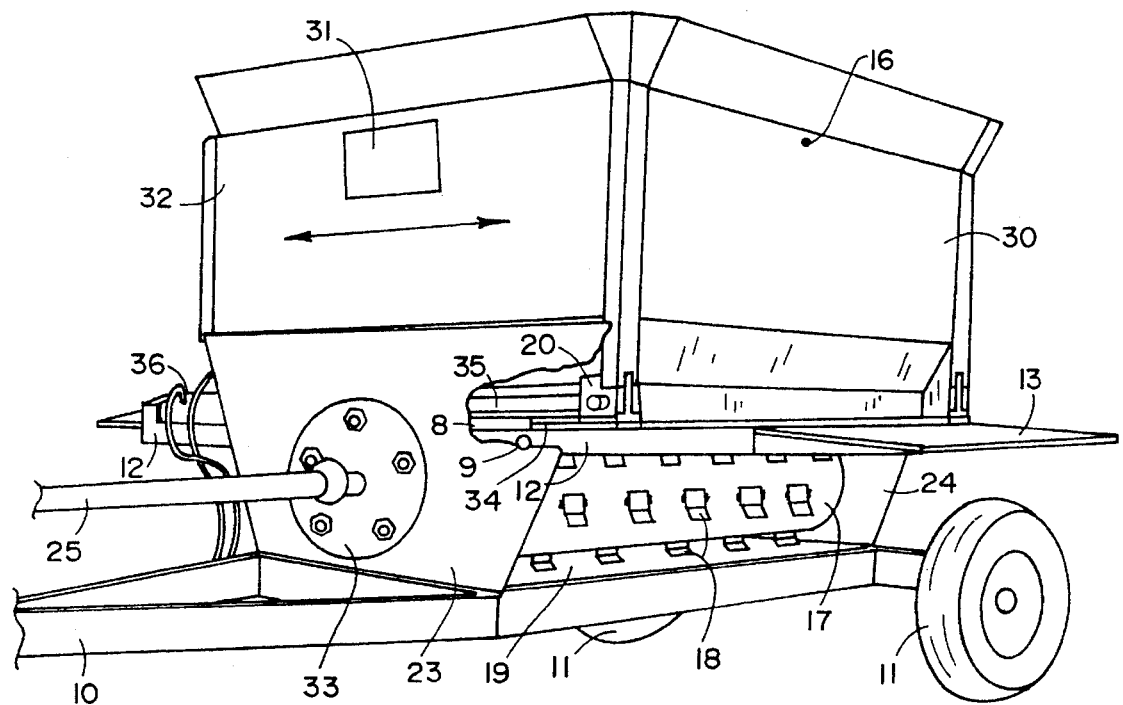
FIG. 1 is a left front perspective view of the material disintegrating apparatus with the loading mechanism and material outlet deflector removed for clarity.
Figure 2:
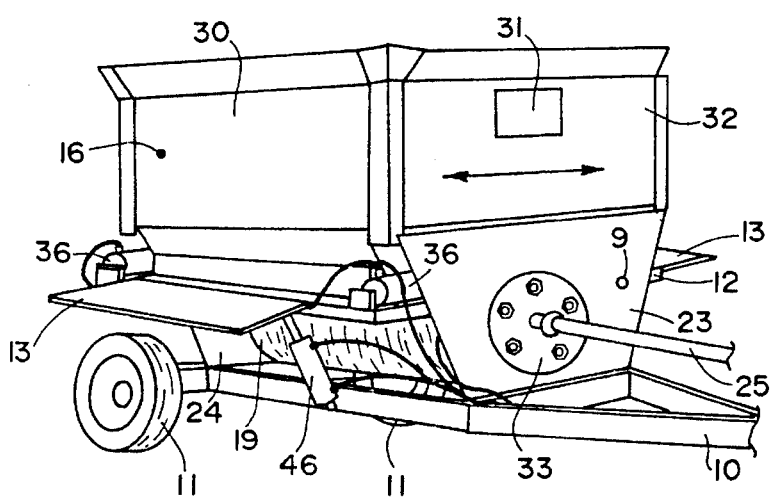
FIG. 2 is a right front perspective view of the material disintegrating apparatus indicating the floor tilting means and the chamber driving cylinders.

Referring now to FIG. 1 there is shown a frame 10 having a longitudinal axis in line with the rotor drive shaft 25 which is normally driven from a tractor power take off (P.T.O.). The drive shaft 25 drives a rotor 17 which is mounted on the frame 10 by means of a front end plate type upright 23 and a rear end plate type upright 24. The rotor 17 is shown here as a drum but may take other forms such as spaced discs with rods therebetween. Mounted on the rotor 17 are cutting or disintegrating flails 18 which may be of various forms two of which are shown in FIG. 9. The flails 18 are pivotally mounted on the rotor 17 so that during operation the flails by centrifugal force extend away from the surface of the rotor 17. Also pivotally mounted on the frame 10 by means of the front upright 33 and rear upright 24 is a table or floor 12. The pivot points are pivot pins 9 on a second axis parallel to the frame longitudinal axis. The pivoting force attached to the floor 12 and to the frame 10 is generally in the form of a hydraulic cylinder 46 shown in FIG. 2. The floor 12 extends laterally of the material receiving chamber 16 which includes two tapered side walls 30 and one tapered end wall 32. The degree of taper may vary with normally a portion of the walls being vertical. An inspection window 31 is usually found in end wall 32 in order to inspect the progress of the bale disintegration. The receiving chamber 16 is slideably mounted on the floor 12. A sliding shoe 20 is integrally joined to the chamber 16 and is moved by an extension or retraction of piston 35 of hydraulic cylinder 36 which is fixed to the floor 12. While hydraulic cylinders are shown other reciprocating movement means such as a rack and pinion or sprocket and chain are also envisaged. Between the sliding shoe 20 and the floor 12 is replaceable low friction slide plate 34. Fixed to the floor 12 is a sliding shoe guide 8 to control the reciprocating movement of the sliding shoe 20 and therefor the chamber 16. Surrounding a portion of the rotor 17 with mounted flails 18 is a shroud 19 which assists in directing the disintegrated material away from the machine or apparatus. Attached to the floor 12 on both sides are floor extensions 13, on the front end upright 23 is a bearing support 33 for the rotor 17 and transporting wheels 11 are rotatably mounted on the frame. The machine or apparatus may be moving or stationary while operating depending on the desired distribution of the material. The back and forth reciprocating motion of the material receiving chamber 16 is normally controlled by an operator on a vehicle connected to the frame 10 for towing, powering the P.T.O. shaft 25 and providing hydraulic pressure required by the chamber hydraulic cylinders 36, the floor pivot cylinder 46 and the fork hydraulic cylinder 44.

Looking now at FIG. 2 there is again shown the material receiving chamber 16 with its walls 30,32 the inspection window 31, the frame 10, P.T.O. shaft 25, rotor front bearing support 33, front upright 23, rear upright 24 floor pivot pin 9 floor 12 and floor extensions 13. What is shown more clearly here is the location of the first drive means including two hydraulic power cylinders 36 fixed to the floor 12, the curvature and location of the shroud 19 and the second drive means including floor pivot power cylinder 46 which is connected to the floor 12 at the upper power end and to the frame 10 at the lower end.

Figure 3:
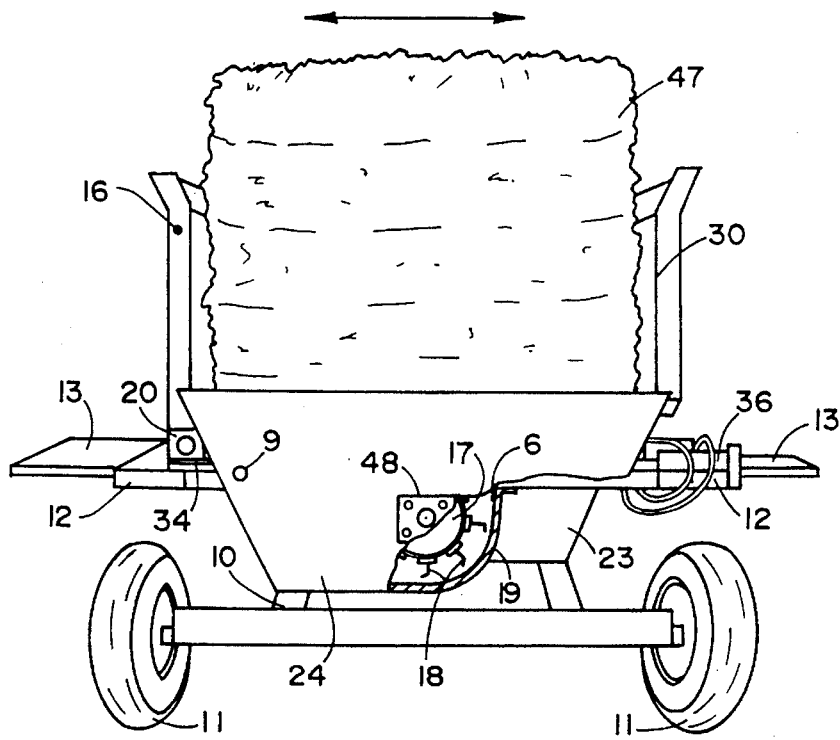
FIG. 3 is a perspective end elevation with the loading mechanism, material outlet deflector and floor tilting cylinder removed for clarity.

FIG. 3 showing a perspective end elevation of the apparatus or machine and again shows the material receiving chamber 16 with its tapered side walls 30 containing a normally large round bale 47 on its end. It is to be realized that the instant invention is not limited to large round bales on end but is also capable of handling round bales laying endwise, large and small rectangular bales and even loose material. The floor 12 with floor extensions 13 are again shown, the sliding shoe 20 with slide plate 34 is again mounted on the floor 12 as is the chamber moving cylinder 36. The rear upright 24 has been partially removed to more clearly show the location of the rotor 17 mounted on the rear rotor bearing support 48 and the cutting flail or elements extended away from the rotor as they would be in operation. The shroud 19 is shown as it extends down from its abutment with floor 12. A baffle plate 6 is shown fixed to the floor 12 so that upon pivoting of the floor away from the shroud 19 by the floor pivot cylinder 46 the disintegrated material will be prevented from escaping.

Figure 4:
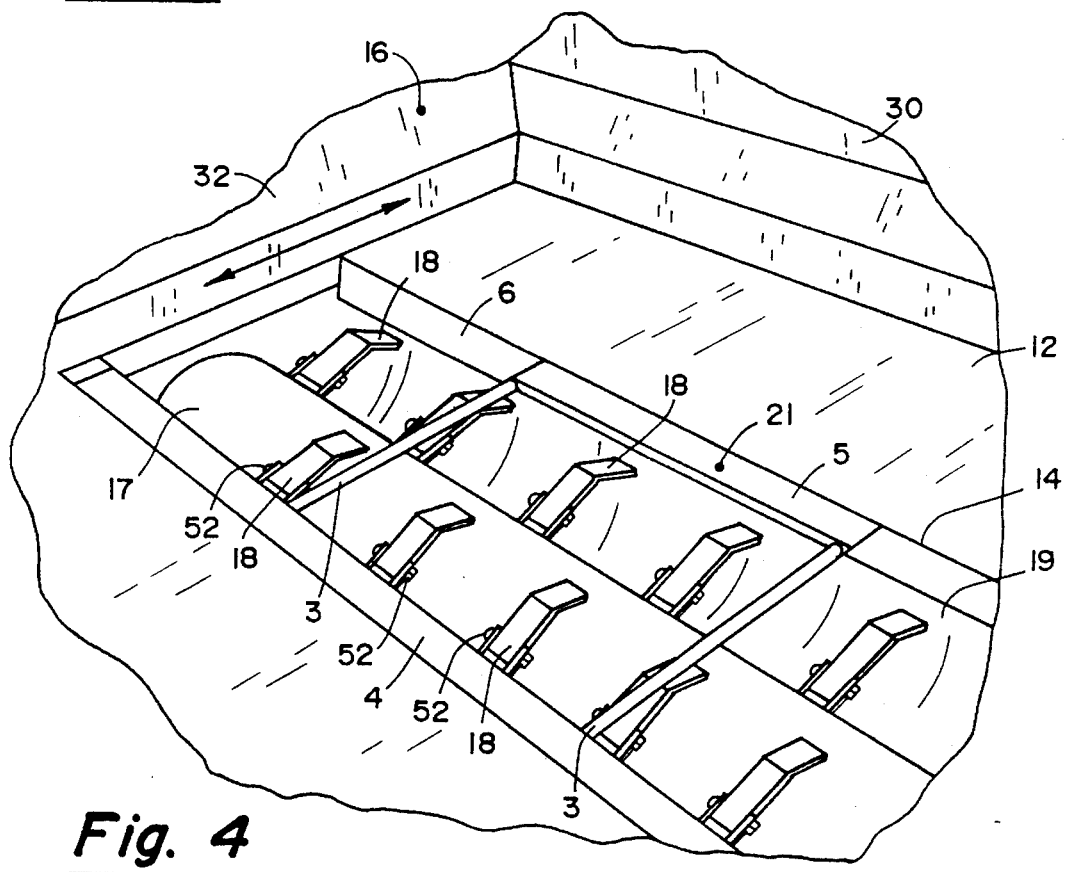
FIG. 4 is a partial perspective end view inside the material receiving chamber indicating the floor opening, grid, rotor with flails and the chamber moveable across the floor.

Making reference now to FIG. 4 there is here shown a perspective enlarged view of the rotor 17 with cutting flails 18 pivotally mounted thereon. The floor 12 may be pivoted but it is of course stationary relative to the transverse movement of the material receiving chamber 16 with its tapered or sloping side walls 30,32. In the floor 12 there is a first opening 14 over which a bale 47 is forced to pass by movement of the chamber 16 thereby exposing same to the cutting flails 18 during rotational operation. Over the first opening 14 there is a control grid assembly 21 including two side plates, side plate left 4, and side plate right 5 which may vary in size or in fact may be replaceably mounted for various types of material. Between the side plates 4 and 5 there are a variable number of grid cross members 3. The control grid assembly 21 is in fact a disintegrating rotor feed control controlling the amount of material to be engaged by the cutting flails 18. When the material disintegrating rotor 17 is operationally driven the cutting flails 18 extend above the material supporting floor 12 at the first opening and engage the material to be disintegrated. When the floor pivot power cylinder 46 is operated the floor pivots upwardly about floor pivot pins 9 and thereby decreases the cut made by the cutting or disintegrating flails 18.

The left rear view of the apparatus is shown in FIG. 5 to illustrate mainly the material handling mechanism mounted on the rear of the main frame 10 and the adjustable discharge means. For reference there is also shown the chamber 16, floor 12, floor extensions 13, rear end upright 24, frame 10, cutting flails 18 and transport wheels 11. The material handling mechanism includes two upright fork posts 43 fixed to the rear end of the main frame 10. Forwardly displaced are fork arm pivots 45 which pivotally support fork arms 41 at their proximal ends. At their distal ends and at an intermediate location the fork arms are joined by an outer cross member 50 and an inner cross member 49. For powered movement of the fork arms 41 there is a hydraulic power cylinder 44 connected at its upper end to the inner cross member 49 and at its lower end to frame 10. Pivotally mounted on the distal end of fork arms 41 are fork tines 40 which are designed to engage a bale such as baled material 47 when on the ground. When the bale is engaged, extension of the fork power cylinder 44 pivots the fork arms 41 to a position shown in FIG. 5 thereby causing the baled material 47 to enter the material chamber 16. Now referring to the adjustable discharge means there is shown a second opening in communication with the disintegrating rotor 17, a shroud 19 partially surrounding the rotor 17 and an adjustable discharge deflector 38. The material disintegrated by the cutting flails 18 is guided by the shroud 19 to exit by the second opening and be further guided or controlled as to final location by an adjustable deflector 38.

The unique design of the pivotal tines is shown in FIG. 6. When the bale 47 has been discharged into the material receiving chamber 16 the material handling mechanism is in the raised position shown in FIG. 5. When in this position the center of gravity of the fork tine 40 is forward of the pivotal tine mount 42 located on fork arm 41. The tine 40 was pivoted forwardly until the tine 40 engaged the fork arm 41 at the pivotal mount 42 thus producing a more compact unit.

FIG. 7 is a cross section of the fork tine 40 taken at the cutting plane 7—7. This new channel shape enhances considerably the functioning of the fork tine 40.

FIG. 8 shows more clearly how the discharge deflector 38 is pivotally connected at the junction of the floor 12 and the floor extension 13 and how it is adjustably held to floor extension 13. Various types of adjusters may be used such as adjuster 39 or in fact it can be adjustably fixed in a full down position for minimum travel and a full up position for maximum distance of travel of the disintegrated material.

The cutting flails 18,18*a* illustrated in FIG. 9, are only two of various ones that may be used. They are pivotally mounted on the rotor 17 by such as a bolt passing through the eye 51 when placed between upright supports 52 welded to the rotor 17.

Various modifications such as size, shape and arrangement of components may be made without departing from the spirit and scope of this invention. The above disclosure shall be interpreted as illustrative only and limited only by the scope of the invention as defined in the following claims.

What I claim is:

1. A machine for disintegrating bales of material comprising in combination, a frame means having a longitudinal axis and including a hitch means for towing, transport wheels rotatably mounted on said frame means, a front end upright plate, a rear end upright plate, a planar material supporting means mounted on said frame means by means of said front end upright plate and said rear end upright plate, a first opening located in a central portion of said planar material supporting means, at least one control grid member extending across said first opening, a material receiving chamber moveably mounted on said planar material supporting means, a first drive means for moving said material receiving chamber in a reciprocating motion substantially transverse to said longitudinal axis thereby moving said material received therein over said first opening, rotary material disintegrating means rotatably mounted on said frame means by means of said front end upright plate and said rear end upright plate, said rotary material disintegrating means including a drum having pivotal material engaging elements mounted thereon which during rotation protrude above said material support means through said first opening thereby engaging and disintegrating said material positioned over said first opening and discharge means mounted on said frame means in communication with said rotary material disintegrating means and including a second opening for egress of material that has been engaged and disintegrated by said rotary material disintegrating means.

2. A machine for disintegrating bales as claimed in claim 1 wherein said planar material supporting means is pivotally mounted relative to said front end upright plate and said rear end upright plate and operated by a second drive means; and further includes material loading means pivotally mounted on said frame means for engaging said material and placing it in said material receiving chamber for disintegration and material deflector means adjustably mounted adjacent said second opening for controlling the location of the material being discharged.

3. A material processing device comprising in combination, frame means having a longitudinal axis, planar material supporting means mounted on said frame means and including a first opening, parallel to said longitudinal axis, material receiving chamber means moveably mounted on said planar material supporting means, a first drive means for moving said material receiving chamber means in a reciprocating back and forth motion substantially transverse to said longitudinal axis thereby moving said material received therein over said first opening, material disintegrating means rotatably mounted on said frame means and including engaging elements which during rotation protrude above said material support means through said first opening thereby engaging and disintegrating said material positioned over said first opening and discharge means mounted on said frame means in communication with said material disintegrating means and including a second opening for egress of material that has been engaged and disintegrated by said material disintegrating means.

4. A material processing device as claimed in claim 3 further including at least one control grid member extending across said first opening and wherein said engaging elements are pivotally mounted cutting flails.

5. A material processing device as claimed in claim 3 further including a front end upright and a rear end upright for the mounting of said planar material supporting means on said frame, and the rotatable mounting of said material disintegrating means on said frame.

6. A material processing device as claimed in claim 5 wherein said planar material supporting means is pivotally mounted relative to said front end upright and to said rear end upright and is operated by a second drive means.

7. A material processing device as claimed in claim 5 wherein said material receiving chamber means is slideably mounted on said planar material support means and wherein said first drive means includes at least one hydraulic power cylinder.

8. A material processing device as claimed in claim 7 wherein said planar material supporting means includes a floor horizontally extending beyond said material receiving chamber means and wherein said first opening is in a central portion of said floor.

9. A material processing device as claimed in claim 8 wherein at least one control grid member extends across said first opening and wherein said engaging elements are pivotally mounted cutting flails.

10. A material processing device as claimed in claim 9 wherein said planar material supporting means is pivotally mounted relative to said front end upright and to said rear end upright and is operated by a second drive means.

11. A material processing device as claimed in claim 10 wherein said discharge means includes a curved wall extending downwardly from said floor on one side of said material disintegrating means and beneath said material disintegrating means to said second opening on a side opposite said one side.

12. A material processing device as claimed in claim 8 wherein said material disintegrating means includes an elongate drum having an outer surface and rotated by an external power source and a multiplicity of cutting flails pivotally mounted on said outer surface and extending away from said outer surface when said elongate drum is rotated, said cutting flails being elongate in form with each one having an eye at its proximal end and a sharp taper at its distal end.

13. A material processing device as claimed in claim 11 further including material loading means transversely pivotally mounted on said frame means for movement along said longitudinal axis, for engaging said material prior to processing and for placing it in said material receiving chamber means to be processed.

14. A material processing device as claimed in claim 13 wherein said front end upright and said rear end upright are each in the form of a flat plate, wherein said frame means includes a hitching means, wherein said material receiving chamber means is rectangular in shape including tapered side walls and one vertical end wall, one of said walls including an inspection window.

15. A material processing device as claimed in claim 13 further including material deflector means adjustably mounted adjacent said second opening for the control of the material being discharged.

16. A material processing device as claimed in claim 15 further including transport ground wheels mounted on said frame means and floor extensions mounted on said floor.

17. A material processing device as claimed in claim 3 further including material handling means for picking up and placing material in said material receiving chamber means, said material handling means including pivotal tines mounted on fork arms, said fork arms being pivotally mounted on said frame means to pivot in the direction of said frame longitudinal axis and being pivoted by power means connected thereto.

18. A material processing device comprising in combination frame means having a longitudinal axis, planar material supporting means pivotally mounted on said frame means and including a first opening for passage therethrough of said material when disintegrated said planar material supporting means being pivotally mounted about an axis substantially parallel to said longitudinal axis, material receiving chamber means moveably mounted on said planar material supporting means, a first drive means for moving said material receiving chamber thereby moving said material received therein over said first opening of said planar material supporting means, material disintegrating means rotatably mounted on said frame means and including engaging elements which during rotation protrude above said planar material supporting means through said first opening %hereby engaging and disintegrating said material positioned over said first opening and discharge means mounted on said frame means in communication with said material disintegrating means and including a second opening for controlled egress of material that has been engaged and disintegrated by said material disintegrating means.

19. A material processing device as claimed in claim 18 wherein said material receiving chamber means is slideably mounted on said planar material supporting means and slides with a reciprocating motion substantially transverse to said longitudinal axis.

20. A material processing device as claimed in claim 19 further including at least one control grid member extending across said first opening and wherein said engaging elements are pivotally mounted cutting flails.

21. A material processing device as claimed in claim 18 further including material handling means for picking up and placing material in said material receiving chamber means, said material handling means including pivotal tines mounted on fork arms, said fork arms being pivotally mounted on said frame means to pivot in the direction of said frame longitudinal axis and being pivoted by power means connected thereto.

22. A material processing device comprising in combination, frame means having a longitudinal axis, means, including a planar surface having a longitudinal first opening parallel to said frame longitudinal axis, mounted on said frame means, for supporting said material to be processed, chamber means, moveably mounted on said means including a planar surface for supporting said material to be processed, for reciprocating said material over said longitudinal first opening substantially transverse to said frame longitudinal axis, means for disintegrating said material by engaging said material as it is reciprocated back and forth across said longitudinal first opening, means for discharging material engaged and disintegrated by said means for disintegrating said material.

23. A material processing device as claimed in claim 22 wherein said planar surface with said chamber means mounted thereon is adjustably tiltable about a longitudinal axis parallel to said frame longitudinal axis.

\* \* \* \* \*